United States Patent [19]

Mayes

[11] Patent Number: 4,492,038
[45] Date of Patent: Jan. 8, 1985

[54] TOP-VIEW-READING LEVEL

[75] Inventor: Daniel J. Mayes, Johnson City, Tenn.

[73] Assignee: Great Neck Saw Manufacturing, Inc., Mineola, N.Y.

[21] Appl. No.: 482,873

[22] Filed: Apr. 7, 1983

[51] Int. Cl.³ ............................................. G01C 9/28
[52] U.S. Cl. .................................................... 33/379
[58] Field of Search ................. 33/379, 381, 382, 383, 33/348

[56] References Cited

U.S. PATENT DOCUMENTS

| 3,835,549 | 9/1974 | De Jong et al. | 33/379 |
| 4,011,660 | 3/1977 | Johnson | 33/379 |
| 4,208,803 | 6/1980 | Brown et al. | 33/379 X |

FOREIGN PATENT DOCUMENTS 193666  1/1938  Switzerland ........................ 33/348

Primary Examiner—Harry N. Haroian
Attorney, Agent, or Firm—Charles L. Lovercheck; Wayne L. Lovercheck; Dale R. Lovercheck

[57] ABSTRACT

A level having an I-shaped frame with a web flanges and a lateral opening in the web. A vial assembly is disposed in the lateral opening for viewing the bubble of the vial. A window opening is formed in at least one flange. Overlying the vial assembly is a transparent window element which is a part of a level vial support for viewing the bubble through the window opening and through the window element. The window element protects the vial from foreign material and from mechanical damage.

4 Claims, 7 Drawing Figures

TOP-VIEW-READING LEVEL

SUMMARY OF INVENTION

The invention relates to a level with a top vial viewing window and more particularly to a level with an I-shaped frame wherein the bubble vial assembly is mounted on the web of the I-shaped frame. In levels of this type it is sometimes desirable to view the vial both vertically from the top and from the side.

The present invention utilizes an I-beam shaped level body or frame, a vial assembly with a vial assembly support on one side of the web of the I-beam and a vial holding portion having two parts, one part being adapted to be disposed on each opposite side of the web for holding the vial rigidly in position adjacent a window opening in the flange by vial supporting members. A transparent window member is supported on one of the vial supporting members and is disposed between the window opening and the vial. According to the invention, a lateral window is situated in the web below the opening in the I-beam flange between the opening and the vial. The upper window is attached to one part of the vial assembly thereby holding the window element tightly in a rigid position against the other part of the vial assembly and in relation to the level frame.

REFERENCE TO PRIOR ART

U.S. Pat. No. 4,011,660 shows a spirit level with top window mounting with a separate transparent window element supported below the window opening by vial supports. Other patents of interest are U.S. Pat. No. 3,190,010 and U.S. Pat. No. 3,835,549. U.S. Pat. No. 3,190,010 shows a level which has no top reading window opening. U.S. Pat. No. 3,835,549 shows a level with a top window opening and a separable window element. None of the prior art shows a level with a top window opening and a lateral opening and a vial assembly supported in the lateral opening with a window element that is an integral part of one of the parts of the vial support.

OBJECTS OF THE INVENTION

It is an object of the invention to provide an improved level with a lateral window opening in one side and another opening in its top.

Another object is to provide a level with a window in its top and a window element on one of its side vial support overlying the vial.

Another object of the invention is to provide a top window mounting for a level that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

DETAILED DESCRIPTION OF DRAWINGS

Figure 1:
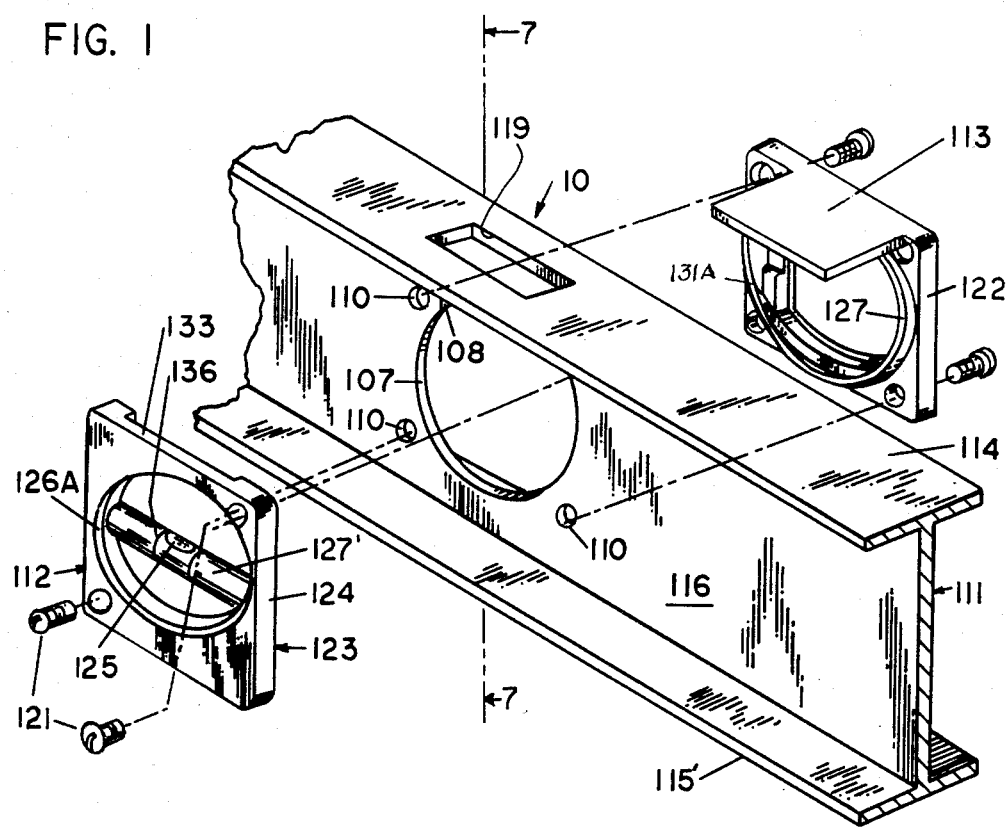
FIG. 1 is an exploded partial prospective view of a level according to the invention.
Figure 2:
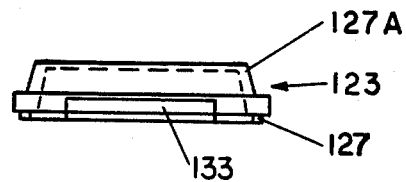
FIG. 2 is a top view of a window element.
Figure 3:
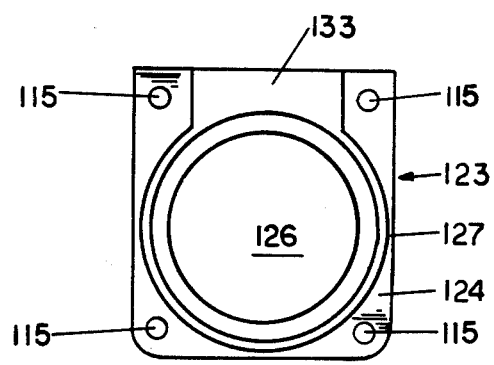
FIG. 3 is a side view of the window element shown in FIG. 2.
Figure 4:
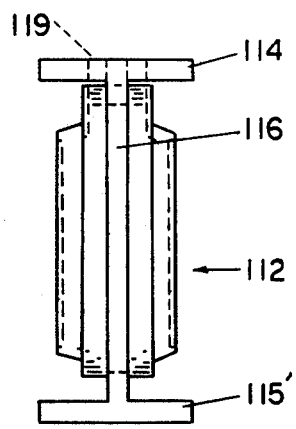
FIG. 4 is an end view of the level.
Figure 5:
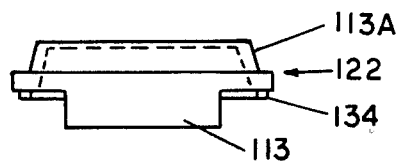
FIG. 5 is a top view of the other window element.
Figure 6:
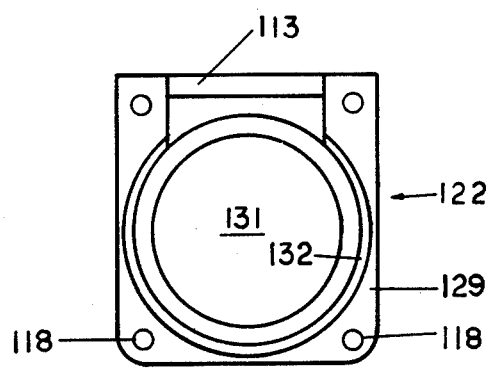
FIG. 6 is a side view of the window element shown in FIG. 5.
Figure 7:
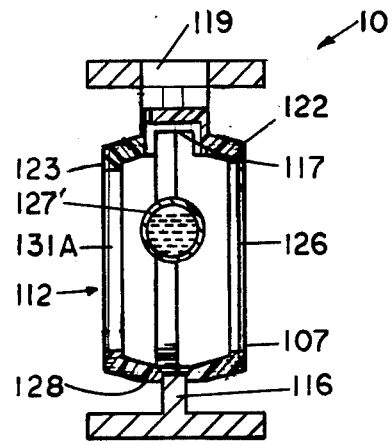
FIG. 7 is a transverse cross sectional view taken on line 7—7 of FIG. 1.

Now, with more specific reference to the drawings, the level 10 disclosed herein has a frame 111 and a bubble vial assembly 112. The frame 111 is elongated and is preferably made of a light weight material such as aluminum or plastic in the form of an I-beam having upper flange 114 and lower flange 115' joined together along the longitudinal center lines by a web 116. A circular opening 107 is formed in the web 116 preferably adjacent the longitudinal center of the I-beam for receipt of the vial assembly 112. Opening 107 is cut away toward the upper flange 114 to provide a pair of edges 108 between which the window member 113 is received. The cut away portion also exposes the level vial to view from viewing opening 119. The rectangular top viewing opening 119 is formed in flange 114 and it thus communicates with the level vial in opening 107.

The rectangular top viewing opening 119 is shown formed in top flange 114 but a similar opening could be provided in the lower flange 115' to provide a level readable from both top and bottom of the frame. Suitable screw holes 110 are formed around the periphery of the opening 107 in the web for receiving screws 121 to pass through holes 115 for tightening the assembly 112 to the frame 111 by means of screws 121.

The bubble vial assembly 112 comprises of pair of rectangular vial supports which include a vial holder support 123 and a window holder support 122. The vial support 123 includes a rectangular peripheral edge portion 124 which has diagonally dispoed holes 115 for receiving the tightening screws 121 which are threadably received in the threaded holes 110 in the web 116. A circular flange locating ring 127 is formed on the inner surface of the edge portion 124 and is adapted to extend into the central vial opening 107 to center the window support 123 with the flange. The inner surface of the edge portion 124 is recessed at 133. Recess 133 extends radially outwardly from the edge of the vial assembly to the viewing opening 119 thus eliminating a portion of the retaining ring 127 and providing a space through which the level vial in opening 107 can be viewed.

The vial support 123 of the level vial assembly 112 is similar to the support portion 122 in that it has similar dimensions and also includes a peripheral edge portion 129, screw receiving holes 118, a viewing opening 131, and transparent window 131A. The ends of the vial are attached to the inside periphery of the vial support 123 by cement or other well known fastening means.

Vial 127' has a pair of spaced line indicators 136 of a usual type for facilitating reading the level and a liquid in the vial tube forms a bubble 125. Thus the vial may be viewed not only from the side through openings 126 and 131, but also from the top through the window opening 119.

The window element 113 may be molded as a part of the window support or it may be attached to the upper edge of the vial support 122 and extends across to the window support 123 and the inner end of the window element 113 is received in the recess 133 in the window support 123.

In assembling the level, the vial support 122 is supported on one side of the web 116 and the locating ring 127 is disposed in the circular opening 107. The support is then attached to the web 116 by two screws 121. The window support 122 is then supported on the other side of the web 116 with ring 132 disposed in the opening 107 from the opposite side from the vial support member 122. The window member 113 will then extend across between the window support 122 and the vial support 123 so that a person looking into the top of the level through the opening 119 may see the level vial through the window element 113. He may also view it from the sides through the transparent windows in openings 126 and 131.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A level vial assembly for use on a level frame having a web with a vial opening in the web and a cut away portion forming a recess extending to one edge of said web,
said vial assembly comprising:
a vial support and a window support,
said vial support having a relatively flat web engaging surface,
a recess in said vial support extending through said relatively flat web engaging surface a substantial distance and adapted to receive a window member and a locating ring on said surface extending therefrom and adapted to be received in said vial opening in said web,
said window support having a relatively flat web engaging surface and a locating ring attached to said flat surface extending therefrom and adapted to extend into said vial opening from the side thereof opposite said vial support,
a window member integrally attached to said window support and adapted to extend through said cut away adjacent said vial opening into said recess in said vial support,
means for securing said parts together as an assembly and to said level frame,
whereby a person viewing said vial assembly through said window member can observe said vial to determine the position of a bubble in said vial.

2. The vial support recited in claim 1 wherein said vial support has a transparent window member in one side thereof and said window support has a transparent window supported on the side thereof opposite said vial support whereby said vial can be observed from either side of said web through said windows.

3. The vial support recited in claim 1 wherein said window member is rectangular in shape and has a side thereof opposite said window support adapted to rest on said vial support.

4. The vial assembly recited in claim 1 wherein said vial assembly is molded from transparent material.

* * * * *